US009842610B2

(12) United States Patent
Kurata (10) Patent No.: US 9,842,610 B2
(45) Date of Patent: Dec. 12, 2017

(54) TRAINING DEEP NEURAL NETWORK FOR ACOUSTIC MODELING IN SPEECH RECOGNITION

(71) Applicant: INTERNATIONAL BUSINESS MACHINES CORPORATION, Armonk, NY (US)

(72) Inventor: Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/752,323

(22) Filed: Jun. 26, 2015

(65) Prior Publication Data

US 2016/0379665 A1 Dec. 29, 2016

(51) Int. Cl.
*G10L 15/10* (2006.01)
*G10L 25/30* (2013.01)
*G10L 15/06* (2013.01)

(52) U.S. Cl.
CPC ............ *G10L 25/30* (2013.01); *G10L 15/063* (2013.01)

(58) Field of Classification Search
CPC ..... G10L 25/30; G10L 15/144; G10L 15/063; G10L 2015/0633
USPC ........................................................ 704/232
See application file for complete search history.

(56) References Cited

U.S. PATENT DOCUMENTS

| 6,128,609 | A | 10/2000 | Rose |
| 9,401,148 | B2* | 7/2016 | Lei ......................... G10L 17/18 |
| 2010/0217589 | A1* | 8/2010 | Gruhn ................... G10L 15/063 |
| | | | 704/232 |
| 2013/0138436 | A1* | 5/2013 | Yu ............................ G06N 3/04 |
| | | | 704/232 |
| 2013/0138589 | A1 | 5/2013 | Yu et al. |
| 2014/0257805 | A1* | 9/2014 | Huang .................. G10L 15/063 |
| | | | 704/232 |

OTHER PUBLICATIONS

Hinton, et al., "Deep Neural Networks for Acoustic Modeling in Speech Recognition" , Apr. 2012, 27 Pages.

* cited by examiner

*Primary Examiner* — Houshang Safaipour
*Assistant Examiner* — Bharatkumar S Shah
(74) *Attorney, Agent, or Firm* — Tutunjian & Bitetto, P.C.; Vazken Alexanian (57) ABSTRACT

A method is provided for training a Deep Neural Network (DNN) for acoustic modeling in speech recognition. The method includes reading central frames and side frames as input frames from a memory. The side frames are preceding side frames preceding the central frames and/or succeeding side frames succeeding the central frames. The method further includes executing pre-training for only the central frames or both the central frames and the side frames and fine-tuning for the central frames and the side frames so as to emphasize connections between acoustic features in the central frames and units of the bottom layer in hidden layer of the DNN.

15 Claims, 10 Drawing Sheets

| DNN training | Input frames | CER (CERR) [%] | | | KER (KERR) [%] | | |
|---|---|---|---|---|---|---|---|
| | | Task 1 | Task 2 | Average | Task 1 | Task 2 | Average |
| Normal | 11 | 20.45 | 31.67 | 26.06 | 12.25 | 15.21 | 13.73 |
| Two-stage fine-tuning | 1 → 11 (m = 0) | 20.44 (0.06) | 32.22 (-1.71) | 26.33 (-0.83) | 12.25 (0.00) | 15.35 (-0.93) | 13.80 (-0.44) |
| | 3 → 11 (m = 1) | 20.17 (1.39) | 31.12 (1.74) | 25.64 (1.57) | 12.11 (1.16) | 14.95 (1.70) | 13.53 (1.43) |
| | 5 → 11 (m = 2) | 20.12 (1.61) | 31.01 (2.09) | 25.57 (1.85) | 12.09 (2.32) | 14.71 (3.30) | 13.40 (2.29) |
| | 7 → 11 (m = 3) | 19.96 (2.40) | 31.44 (0.73) | 25.70 (1.57) | 11.97 (3.55) | 14.97 (1.60) | 13.47 (1.95) |
| | 9 → 11 (m = 4) | 20.21 (1.20) | 31.42 (0.80) | 25.81 (1.00) | 12.15 (1.33) | 14.92 (1.95) | 13.53 (1.38) |
| Regularization | 11 | 20.08 (1.79) | 31.39 (0.88) | 25.74 (1.34) | 12.04 (1.69) | 14.79 (2.75) | 13.42 (2.22) |

700

| DNN training | CER (CERR) [%] | | | KER (KERR) [%] | | |
|---|---|---|---|---|---|---|
| | Task 1 | Task 2 | Average | Task 1 | Task 2 | Average |
| Normal | 16.28 | 26.80 | 21.54 | 9.14 | 11.48 | 10.31 |
| Two-stage fine-tuning | 16.12 (1.00) | 26.42 (1.41) | 21.27 (1.20) | 9.05 (1.00) | 11.20 (2.37) | 10.12 (1.68) |

TRAINING DEEP NEURAL NETWORK FOR ACOUSTIC MODELING IN SPEECH RECOGNITION

BACKGROUND

Technical Field

The present invention relates to training Deep Neural Network (DNN), and more specifically, to an improvement of training DNN for acoustic modeling in speech recognition.

Description of the Related Art

Recently, DNN is widely used as a feature extractor for Gaussian Mixture Model-Hidden Markov Model (GMM-HMM) systems and Acoustic Models (AMs) for DNN-HMM systems in automatic speech recognition (ASR). DNN for ASR typically comprises an input layer accepting several concatenated frames of multi-dimensional acoustic features, hidden layers, and an output layer predicting the HMM state of the center frame in the input layer. DNN for ASR automatically estimates parameters such as weights and biases between the input layer, the hidden layers and the output layer based on a certain training criterion such as cross entropy so as to predict the HMM state of the center frame in the input layer via the output layer.

In speech recognition using DNN it is common practice to concatenate some consecutive frames of the acoustic features as input of DNN. As an example of concatenating consecutive frames, Non Patent Literature (D. Povey, B. Kingsbury, L. Mangu, G. Saon, H. Soltau, and G. Zweig, "fMPE: Discriminatively trained features for speech recognition," in Proc. ICASSP, 2005, pp. 961-964) discloses the Acoustic context expansion. In the Acoustic context expansion, a vector of posteriors is formed on each frame, and further expanded with left and right acoustic context.

The several concatenated frames accepted by the input layer include central frames consisting of the center frame and a few frames preceding or succeeding the center frame and side frames preceding or succeeding the central frames, however, in conventional DNN training, the acoustic features of side frames in the input layer are related to the HMM state of the center frame in spite of the fact that the side frames may contain irrelevant information, and therefore, there may be some risks for over-fitting to the DNN training data because of relying too much on the side frames, especially considering the frame-based processing of ASR.

SUMMARY

According to an embodiment of the present invention, a method for training a Deep Neural Network (DNN) for acoustic modeling in speech recognition is provided. The method includes reading central frames and side frames as input frames from a memory, the side frames being preceding side frames preceding the central frames and/or succeeding side frames succeeding the central frames. The method further includes executing pre-training for only the central frames or both the central frames and the side frames and fine-tuning for the central frames and the side frames so as to emphasize connections between acoustic features in the central frames and units of the bottom layer in hidden layer of the DNN. Thus, the present invention may prevent over-fitting to the DNN training data caused by relying too much on the side frames and thereby improve speech recognition accuracy.

Preferably, executing pre-training and fine-tuning includes executing the pre-training only for the central frames, executing the fine-tuning only for the central frames for at least one time, and executing the fine-tuning for both the central frames and the side frames. Thus, the present invention may prevent over-fitting to the DNN training data caused by relying too much on the side frames and thereby improve speech recognition accuracy.

Preferably, executing pre-training and fine-tuning includes executing the pre-training for both the central frames and the side frames, and executing the fine-tuning with applying regularization on the connections from the side frames so as to emphasize connections between acoustic features in the central frames and units of the bottom layer of hidden layers of the DNN. Thus, the present invention may prevent over-fitting to the DNN training data caused by relying too much on the side frames and thereby improve speech recognition accuracy.

In addition, according to another embodiment of the present invention, a computer program product for training DNN for acoustic modeling in speech recognition corresponding to the above methods is provided so as to emphasize connections between acoustic features in the central frames and units of the bottom layer in hidden layer of the DNN. Thus, the present invention may prevent over-fitting to the DNN training data caused by relying too much on the side frames and thereby improve speech recognition accuracy.

Furthermore, according to further another embodiment of the present invention, an information processing apparatus corresponding to the above methods is provided so as to emphasize connections between acoustic features in the central frames and units of the bottom layer in hidden layer of DNN. Thus, the present invention may prevent over-fitting to the DNN training data caused by relying too much on the side frames and thereby improve speech recognition accuracy.

DETAILED DESCRIPTION

Figure 1:
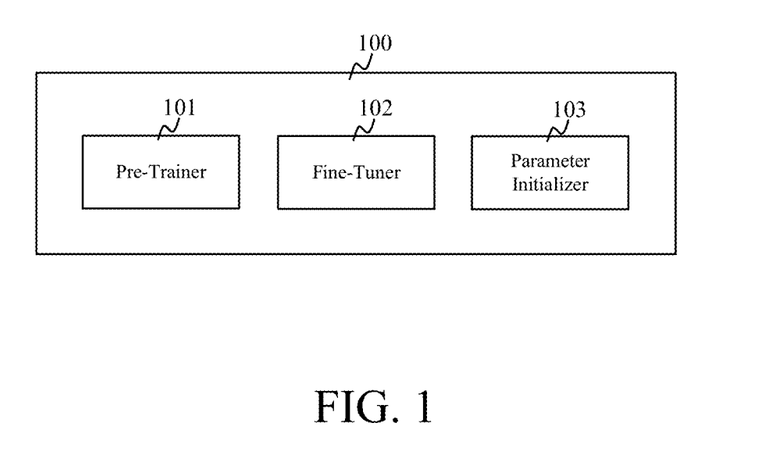
FIG. 1 is a functional block diagram of the information processing apparatus 100 training DNN used for acoustic modeling in speech recognition according to the first embodiment.

FIG. 1 shows the functional blocks of the information processing apparatus 100 for training DNN used for acoustic modeling in speech recognition according to the first embodiment. The apparatus 100 comprises the pre-trainer 101, the fine-tuner 102, and the parameter initializer 103.

Figure 2:
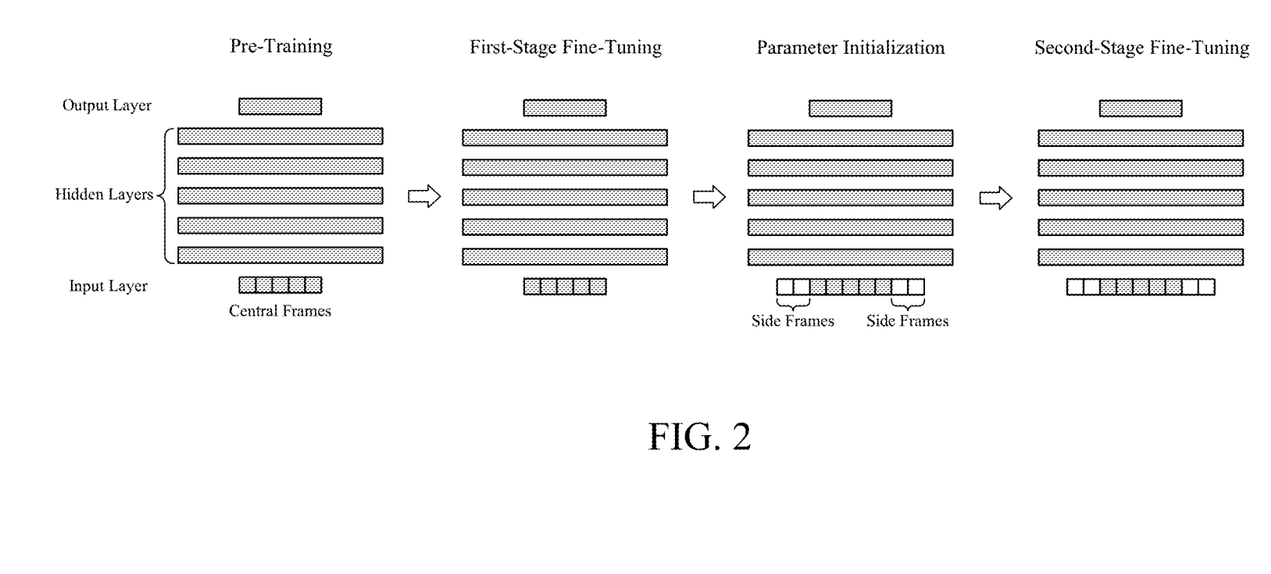
FIG. 2 shows the two-stage fine-tuning process according to the first embodiment of the present invention schematically.

The pre-trainer 101 executes pre-training for DNN so as to set up DNN topology as shown in FIG. 2. Several concatenated frames accepted by input layer include central frames consisting of the center frame and a few frames preceding and/or succeeding the center frame and side frames preceding and/or succeeding the central frames. Side frames preceding and/or succeeding the central frames are hereinafter referred to as "side frames". The pre-trainer 101 reads only the central frames in training data of acoustic features extracted from utterances stored in a memory, not shown in the figure, comprised in the apparatus 100 as input frames and executes the pre-training for only the central frames to estimate parameters for connections between the central frames and units in the bottom layer of hidden layers.

The fine-tuner 102 executes fine-tuning for the input layer, hidden layers and output layer so as to estimate the parameters between the input layer and the bottom layer of the hidden layers, parameters in the hidden layers and parameters between the top layer of the hidden layers and output layer to provide probabilities of the HMM state of the center frame accepted in the input layer via the output layer. In the fine-tuning, the fine-tuner 102 updates all the above parameters using algorithm such as backpropagation algorithm.

In the first embodiment of the present invention, the fine-tuner 102 may execute two-stage fine-tuning as shown in FIG. 2. In a first stage of the fine-tuning, the fine-tuner 102 executes fine-tuning only with the central frames. In a second stage of the fine-tuning, the fine-tuner 102 executes fine-tuning with the central frames and the side frames after the parameter estimation by the first stage of the fine-tuning described below.

The fine-tuner 102 may update the parameters of connections between acoustic features in an input layer and units in the bottom layer of hidden layers using the equation described as below in algorithm such as a backpropagation algorithm.

$$p = p - \alpha \frac{1}{s} \Delta p \quad \text{[Formula 1]}$$

where p is a parameter, $\alpha$ is a learning rate, and s is the number of utterances in each mini-batch that consists of training data of pre-fixed size, when using mini-batch SGD. Other family of SGD can be used.

The parameter initializer 103 initializes parameters between the input layer and the bottom layer of the hidden layers before the pre-training and parameters for connections from side frames with random values after the first-stage fine-tuning.

The parameter initializer 103 may initialize the parameters of each layer randomly depending on the number of input units and output units. For example, the parameter initializer 103 may initialize the parameters using random numbers ranging from −L to L, wherein L is a value proportional to the inverse of the square root of the product of the number of input units and the number of output units.

Figure 3:
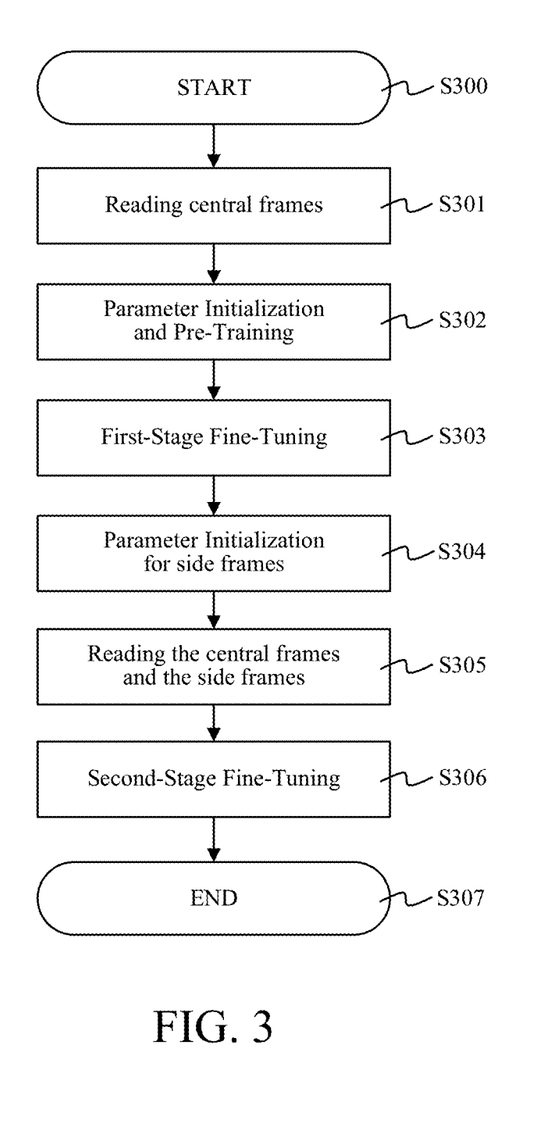
FIG. 3 is a flowchart describing the process of training DNN according to the first embodiment of the present invention.

FIG. 3 shows the flowchart describing the processes of training DNN according to the first embodiment of the present invention. In this embodiment, the apparatus 100 executes two-stage fine-tuning.

The process described in FIG. 3 starts from the step S300 and in the step S301 the pre-trainer 101 reads central frames in training data of acoustic features from the memory as input frames. In this embodiment, the number of frames in the central frames (2m+1), the number of frames in side frames, and the number of the input frames (2n+1; n>m) may be predetermined, wherein m is 0 or an integer number more than 0 and n is an integer number more than 0.

In the step S302, the parameter initializer 103 initializes parameters for the connections between the central frames and the units in the bottom layer of the hidden layers and the pre-trainer 101 executes the pre-training to estimate parameters for the connections. In the step S303, the fine-tuner 102 reads the central frames from the memory, and executes the first-stage fine-tuning with the central frames so as to estimate the parameters of connections between acoustic features in the central frames and units of the bottom layer of hidden layers and the parameters of connections between units in the other layers.

In the step S304, the parameter initializer 103 initializes the parameters of connections between side frames and the bottom layer of hidden layers. Here, it should be noted that the parameters estimated in the step S303 are not initialized in the step S304.

In the step S305, the fine-tuner 102 reads from the memory the central frames and the side frames thereof in the training data.

In the S306, the fine-tuner 102 executes the second-stage fine-tuning with the central frames and the side frames so as to estimate the parameters of connections between acoustic features in the central frames and units of the bottom layer of hidden layers, the parameters of connections between acoustic features in the side frames and the units of the bottom layer of hidden layers, and the parameters of connections between units in the other layers; then the process shown in FIG. 3 goes to the step S307 to terminate the process. In the second-stage fine-tuning, the fine-tuner 102 uses the same training data set, i.e. audio data and the audio data with transcription data, used in the first-stage fine-tuning executed in the step S302. It should be noted that all of parameters in DNN are tuned in the step S306.

Figure 4:
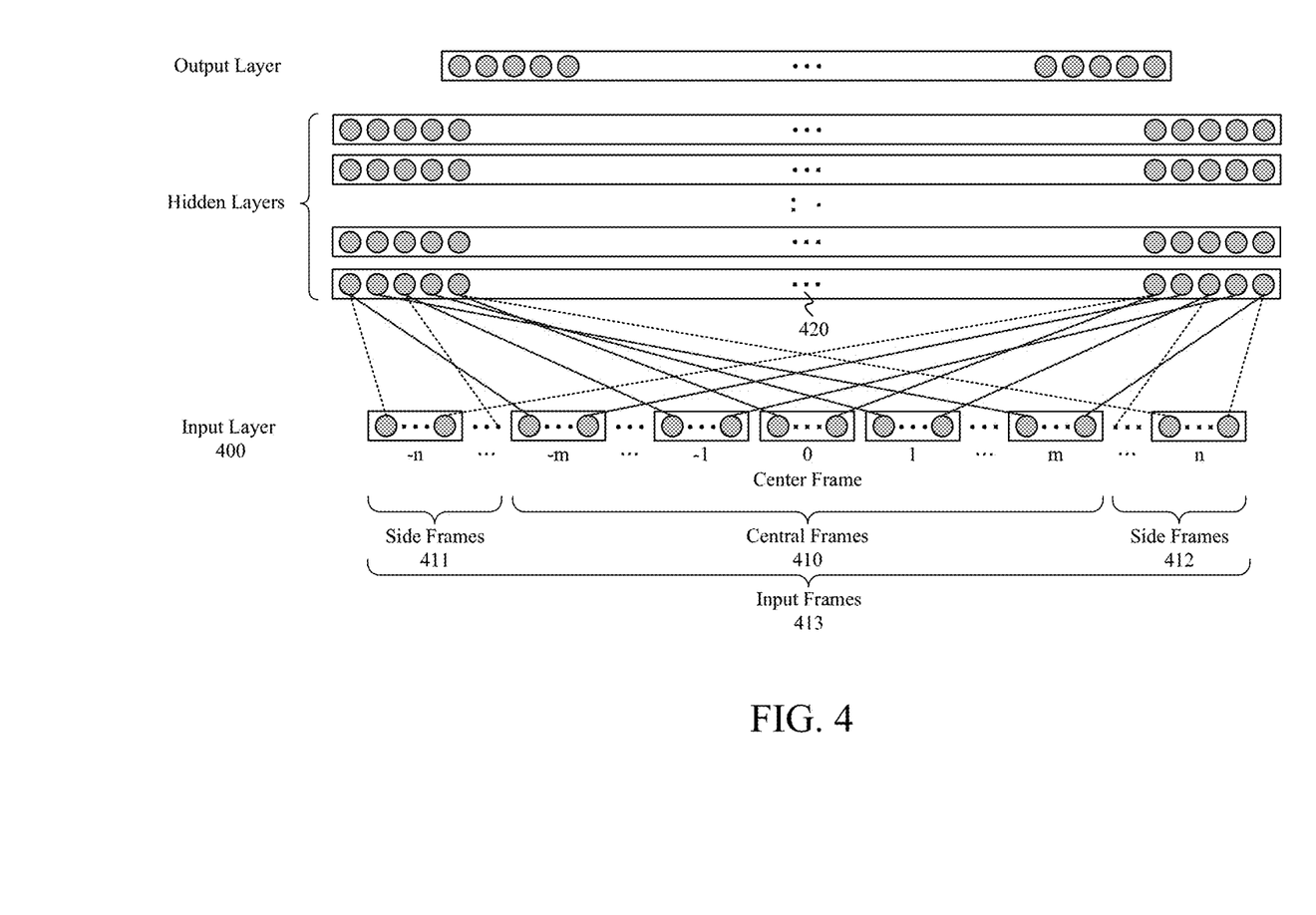
FIG. 4 shows an exemplary DNN topology and connections between input layer and the bottom layer of hidden layers.

FIG. 4 shows the exemplary DNN topology and connections between the input layer and the bottom layer of hidden layers in DNN. As shown in FIG. 4, the input layer 400 may include the central frames 410, the preceding side frames 411 and the succeeding side frames 412; the central frames 410 includes 2m+1 frames and the input layer 400 includes 2n+1 input frames 413. The connections between acoustic features in the central frames 410 and units in the bottom layer 420 of hidden layers are described using the solid lines, and these connections are emphasized by two-stage fine-tuning set forth above. On the other hand, the other connections between acoustic features in the side frames 411, 412 and the units in the bottom layer 420 of hidden layers are described using the dashed lines, and these connections are relatively weakened as a result of emphasizing the connections between acoustic features in the central frames 410 and units in the bottom layer 420 of hidden layers by two-stage fine-tuning set forth above. Thus, the embodiment using the two-stage fine-tuning may prevent over-fitting to the DNN training data caused by relying too much on the side frames and thereby improve speech recognition accuracy.

In the second embodiment of the present invention, the apparatus 100 executes fine-tuning with applying regularization on the connections from the side frames so as to emphasize connections between acoustic features in the central frames and units of the bottom layer of hidden layers of DNN. The second embodiment of the present invention is to be discussed below with reference to FIG. 5 and FIG. 6.

Figure 5:
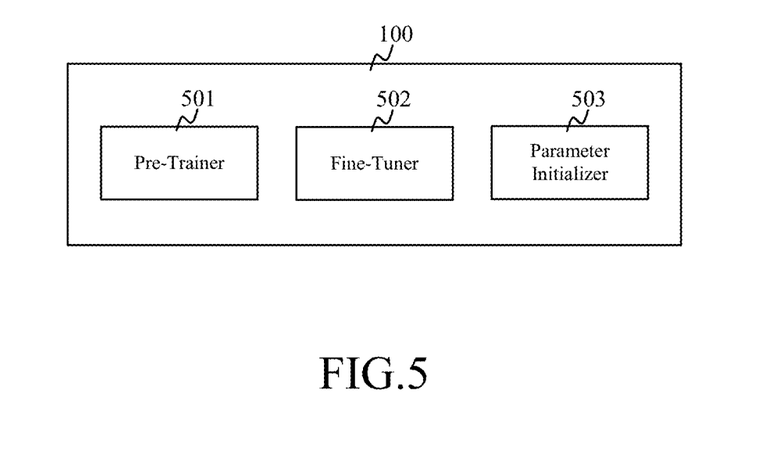
FIG. 5 is a functional block diagram of the information processing apparatus 100 training DNN used for acoustic modeling in speech recognition according to the second embodiment of the present invention.

FIG. 5 shows the functional blocks of the information processing apparatus 100 for training DNN used for acoustic modeling in speech recognition according to the second embodiment. The apparatus 100 comprises the pre-trainer 501, the fine-tuner 502 and the parameter initializer 503.

The parameter initializer 503 initializes parameters for the connections between the central frames and the side frames, and the units in the bottom layer of the hidden layers. The pre-trainer 501 executes the pre-training for the central frames and the side frames.

The fine-tuner 502 updates the parameters of connections between acoustic features of the central frames in an input layer and units in the bottom layer of hidden layers using the equation described as below in algorithm such as a back-propagation algorithm.

$$p = p - \alpha \frac{1}{s} \Delta p \quad \text{[Formula 2]}$$

where p is a parameter, α is a learning rate, and s is the number of utterances in each mini-batch that consists of training data of pre-fixed size, when using mini-batch SGD. Other family of SGD can be used.

On the other hand, the fine-tuner 502 updates the parameters of connections between acoustic features of the side frames in the input layer and the units in the bottom layer of hidden layers using equation described as below in a back-propagation algorithm.

$$p = p - \alpha \left( \frac{1}{s} \Delta p + \lambda p \right) \quad \text{[Formula 3]}$$

where p is a parameter, α is a learning rate, s is the number of utterances in each mini-batch that consists of training data of pre-fixed size, when using mini-batch SGD, and λ is a regularization term so as to decrease the parameter updates related to the connections between the acoustic features of the side frames in the input layer and the units in the bottom layer of hidden layers.

Figure 6:
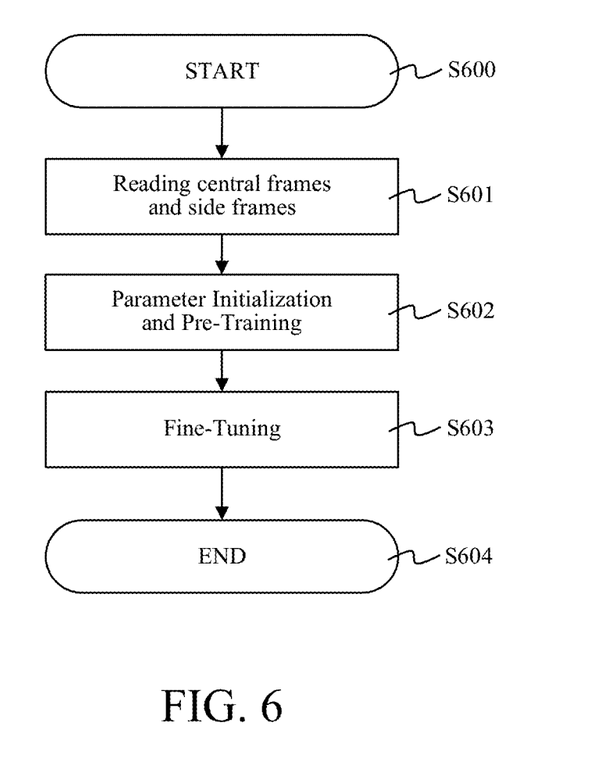
FIG. 6 is a flowchart describing the process of training DNN according to the second embodiment of the present invention.

FIG. 6 shows the flowchart describing the process of training DNN according to the second embodiment of the present invention. The process described in FIG. 6 starts from the step S600 and in the step S601 the pre-trainer 501 reads the central frames and the side frames in training data of acoustic features from the memory as input frames. In the step S602, the parameter initializer 503 initializes parameters for the connections between the central frames and the side frames and the units in the bottom layer of the hidden layers and the pre-trainer 501 executes the pre-training to estimate parameters for the connections.

In the step S603, the fine-tuner 502 reads from the memory the central frames and the side frames thereof in the training data, and executes the fine-tuning with the central frames and the side frames so as to estimate the parameters of connections between acoustic features in the central frames and units of the bottom layer of hidden layers using Formula 2, the parameters of connections between acoustic features in the side frames and the units of the bottom layer of hidden layers using Formula 3, and the parameters of connections between units in the other layers using Formula 2; then the process shown in FIG. 6 goes to the step S604 to terminate the process.

The embodiment using the regularization may weaken the connections between acoustic features in the side frames and the units in the bottom layer of hidden layers and thereby the connections between acoustic features in the central frames and units in the bottom layer of hidden layers are relatively emphasized. Thus, this embodiment may prevent overfitting to the DNN training data caused by relying too much on the side frames and thereby improve speech recognition accuracy.

Although the regularization term for the side frames is used in the above described embodiment, it should be noted that regularization terms for the central frames and the side frames may be used, wherein the regularization term for the central frames is smaller than the regularization term for the side frames.

Figure 7:
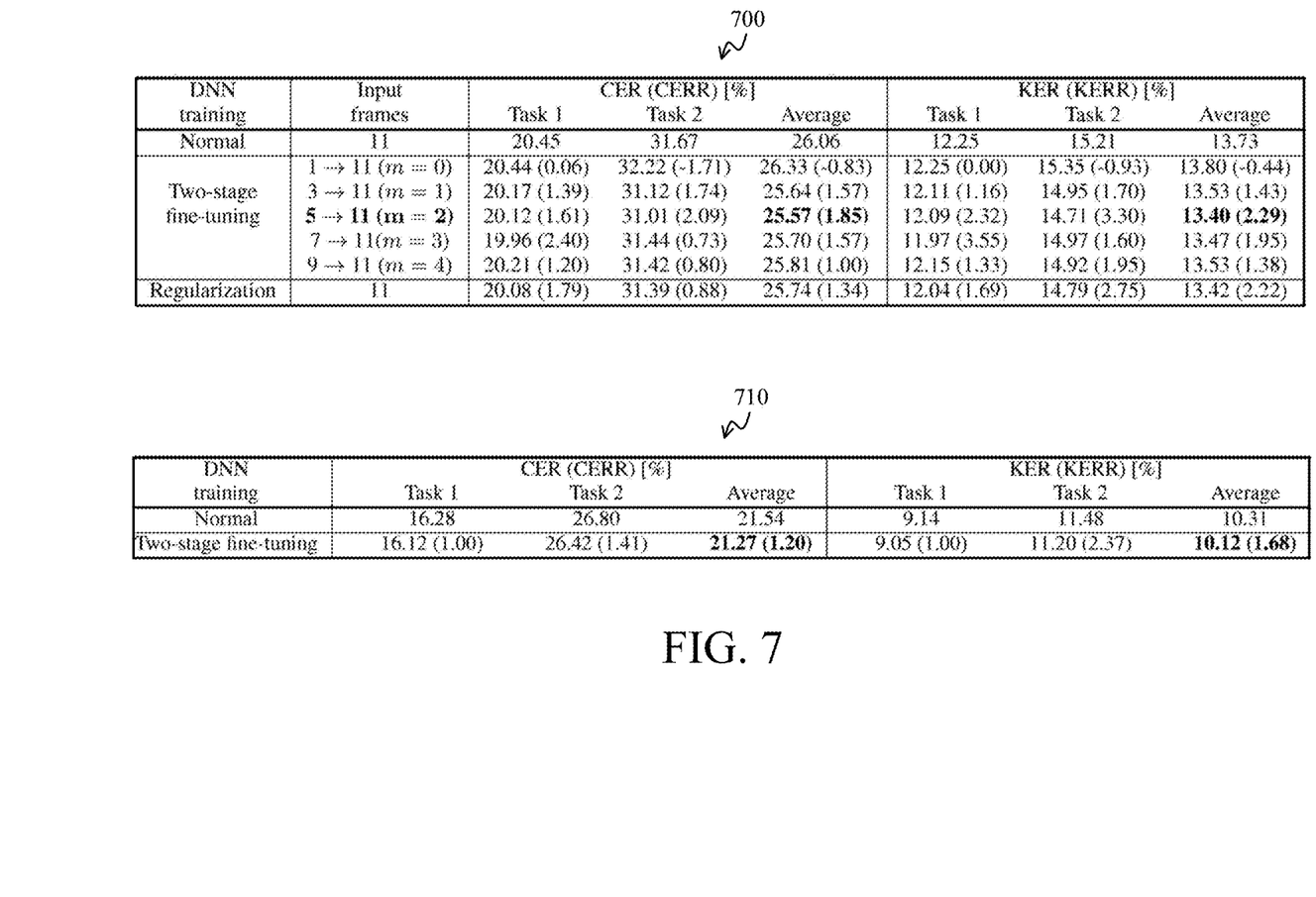
FIGS. 7 and 8 show experimental results of the normal training method of DNN and the training method of DNN according to the embodiments of the present invention.

FIG. 7 shows experimental results of the normal training method of DNN and the training method of DNN according to the embodiments of the present invention. The table 700 shows the experimental results using small amounts of training data. The table 710 shows the experimental results using large amounts of training data. These tables 700, 710 show the Character Error Rate (CER), the CER Reduction (CERR) from normal training, the Kana Error Rate (KER), and the KER Reduction (KERR) from normal training, respectively.

As shown in the table 700, the two-stage fine-tuning (m=2) may reduce the CER by 1.85% and the KER by 2.29% on average in comparison with the normal training method; the method using the regularization may reduce the CER by 1.34% and the KER by 2.22% on average in comparison with the normal training method. Furthermore, as shown in the table 710, the two-stage fine-tuning (m=2) may reduce the CER by 1.20% and the KER by 1.68% on average in comparison with the normal training method.

Figure 8:
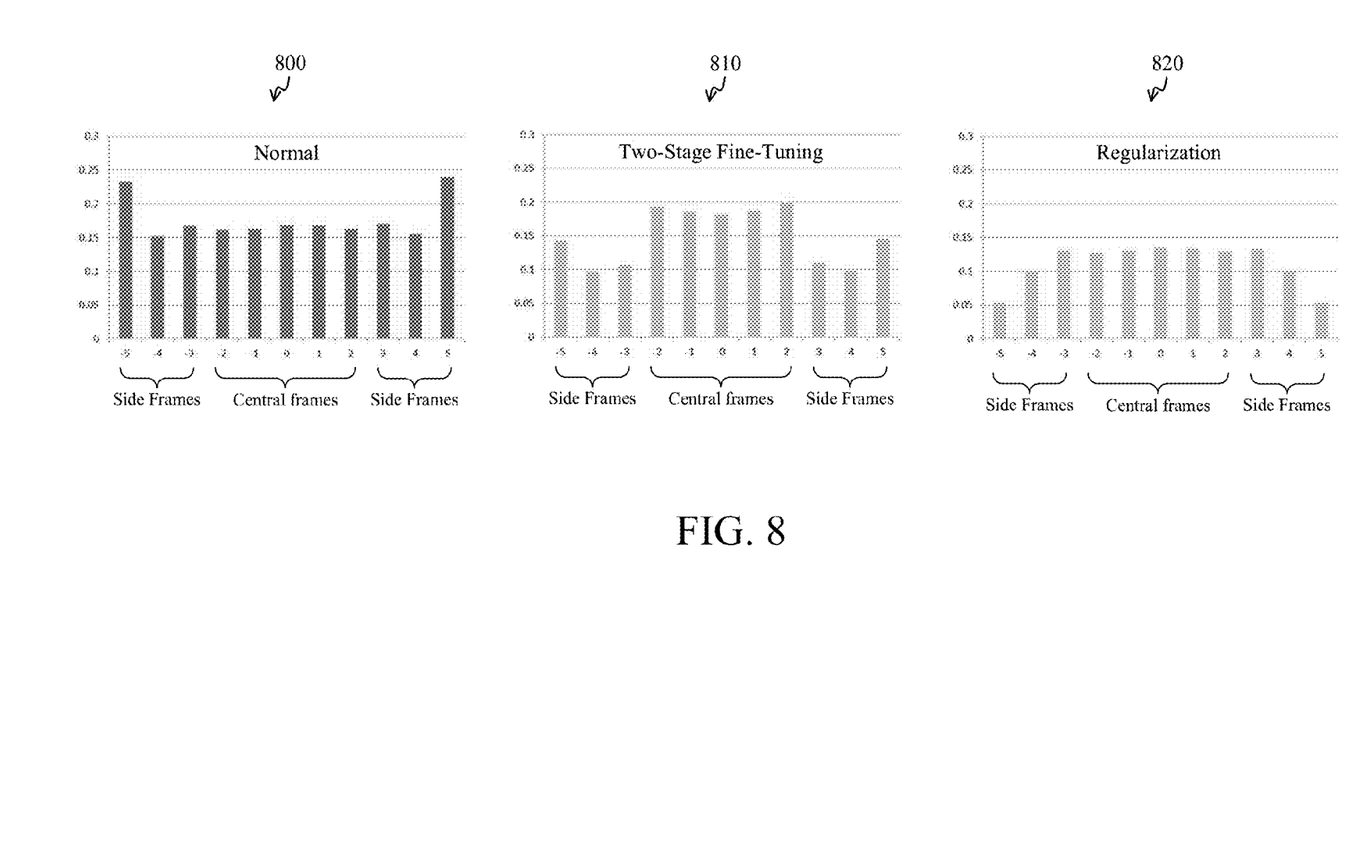

FIG. 8 shows experimental results of the normal training method of DNN and the training method of DNN according to the embodiments of the present invention. The graph 800 shows the averaged weight magnitudes between each frame in the input layer and the bottom layer of hidden layers for the normal DNN training. The graph 810 shows the averaged weight magnitudes between each frame in the input layer and the bottom layer of hidden layers when the method using the two-stage fine-tuning is applied. The graph 820 shows the averaged weight magnitudes between each frame in the input layer and the bottom layer of hidden layers when the method using the regularization is applied.

As shown in the graph 810, the two-stage fine-tuning (m=2) may increase the weight magnitudes for the connections from the central frames, and decrease the weight magnitudes for the connections from the side frames. As shown in the graph 820, the method using the regularization may increase the weight magnitudes of the central frames, and may decrease the weight magnitudes of the side frames. The results suggests that the connections between the acoustic features in the central frames and the units in the bottom layer of hidden layers may be emphasized; on the other hand, the connections between the acoustic features in the side frames and the units in the bottom layer of hidden layers may be weakened by the method using two-stage fine-tuning and the method using the regularization.

In the third embodiment of the present invention, the apparatus 100 executes fine-tuning for several times with gradually increasing the number of frames of the central frames. The third embodiment of the present invention is to be discussed below.

Figure 9:
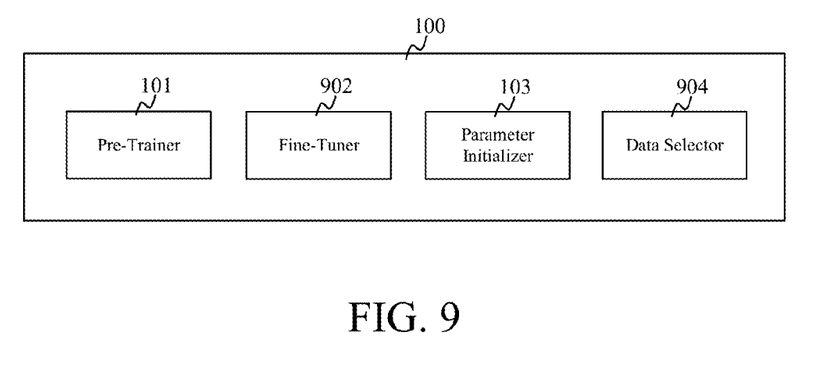
FIG. 9 is a functional block diagram of the information processing apparatus 100 training DNN used for acoustic modeling in speech recognition according to the third embodiment of the present invention.

FIG. 9 shows the functional blocks of the information processing apparatus 100 for training DNN used for acoustic modeling in speech recognition according to the third embodiment. The apparatus 100 comprises the pre-trainer 101, the fine-tuner 902, the parameter initializer 103 and the data selector 904. The pre-trainer 101 and the parameter initializer 103 are the same as the pre-trainer and the parameter initializer in the first embodiment.

The fine-tuner 902 executes the fine-tuning for several times with gradually increasing the number of frames of the central frames. For example, assuming that the maximum central frames includes 11 frames, one set of the central frames may comprise 5 frames (m=2); another set of the central frames may comprise 7 frames (m=3); further another set of the central frames may comprise 9 frames (m=4); and the last set of the central frames may comprise 11 frames (m=5), wherein the variable m is the same as the integer number m set forth above.

The fine-tuner 902 may update the parameters of connections between acoustic features in an input layer and units in the bottom layer of hidden layers using the equation described as below in algorithm such as a backpropagation algorithm.

$$p = p - \alpha \frac{1}{s} \Delta p \qquad \text{[Formula 4]}$$

where p is a parameter, α is a learning rate, and s is the number of utterances in each mini-batch that consists of training data of pre-fixed size, when using mini-batch SGD. Other family of SGD can be used.

The data selector 904 initializes and increments the variable m used in the process of training DNN according to the third embodiment.

Figure 10:
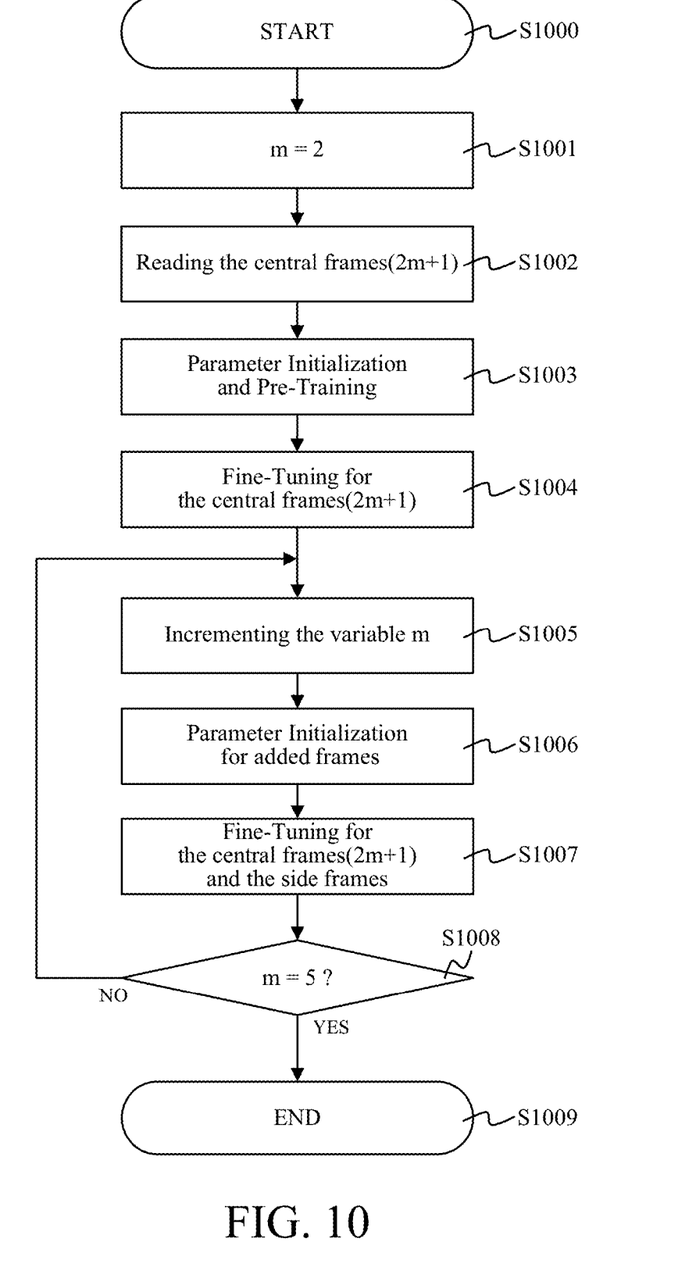
FIG. 10 is a flowchart describing the process of training DNN according to the third embodiment of the present invention.

FIG. 10 shows the flowchart describing the process of training DNN according to the third embodiment of the present invention. The process described in FIG. 10 starts from the step S1000 and in the step S1001 the data selector 904 initializes the variable m with 2. In the step S1002, the pre-trainer 101 reads the central frames in training data of the acoustic features from the memory as input frames, wherein the number of the central frames is 2m+1. In the step S1003, the parameter initializer 103 initializes parameters for the connections between the central frames and the units in the bottom layer of the hidden layers and the pre-trainer 101 executes the pre-training to estimate the parameters for the connections.

In the step S1004, the fine-tuner 902 executes the fine-tuning with the central frames so as to estimate the parameters of connections between acoustic features in the central frames and units of the bottom layer of hidden layers and the parameters of connections between units in the other layers.

In the step S1005, the data selector 904 increments the variable m. In the step S1006, the parameter initializer 103 initializes the parameters of connections between acoustic features of frames added when incrementing the variable m and the units of the bottom layer of hidden layers. Here, it should be noted that the parameters estimated in the step S1004 are not initialized in the step S1007.

In the step S1007, the fine-tuner 902 reads the central frames and the side frames from the memory as input frames and executes the fine-tuning for the central frames and the side frames for estimating the parameters of connections between acoustic features in the central frames and units of the bottom layer of hidden layers; the parameters of connections between acoustic features in the side frames and the units of the bottom layer of hidden layers; and the parameters of connections between units of the other layers. In this fine-tuning, the fine-tuner 902 uses the same training data set used in the prior fine-tuning executed in the step S1004. It should be noted that all of the parameters in DNN are tuned in the step S1007.

In the step S1008, the fine-tuner 902 determines whether the fine-tuning based on configuration of the variable m is completed, i.e. the fine-tuner 902 determines whether the variable m is 5 in the embodiment described in FIG. 8. If the fine-tuning based on the configuration is not completed (NO), the process is reverted to the step S1005 and the variable m is increased and the step S1006 and S1007 are executed. If the fine-tuning based on the configuration is completed (YES), the process goes to the step S1009 to terminate the process. In the third embodiment, the variable m is increased one by one with each repetition of the execution of the fine-tuning.

Generally, an excessive enlargement of the number of the input frames leads to over-fitting to the DNN training data to debase speech recognition accuracy. In the third embodiment, however, gradual learning is possible and thereby speech recognition accuracy will be improved.

Although the variable m is increased one by one in the third embodiment, the variable m may be increased discretely, for example m=1, 3, 8, 9 in another embodiment. In this embodiment, gradual learning is also possible and thereby speech recognition accuracy will be improved.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method in a computer for training a Deep Neural Network for acoustic modeling in speech recognition, said method comprising:
   reading only central frames as input frames from a memory in a first reading function,
   executing pre-training and fine-tuning for the central frames to estimate parameters for connections between the central frames and units in a bottom layer of hidden layers;
   reading central frames and side frames as input frames from the memory in a next reading function; and
   executing pre-training and fine-tuning for both the central frames and the side frames to emphasize connections between acoustic features in the central frames and units of the bottom layer of the hidden layers of the Deep Neural Network.

2. The method of claim 1, wherein executing pre-training and fine-tuning comprises:
   executing the pre-training only for the central frames;
   executing the fine-tuning only for the central frames for at least one time; and executing the fine-tuning for both the central frames and the side frames.

3. The method of claim 2, wherein the execution of the fine-tuning is repeated, and said method further comprising:
increasing the number of frames of the central frames with each repetition of the execution of the fine-tuning with the central frames.

4. The method of claim 1, wherein executing pre-training and fine-tuning comprises:
executing the pre-training for both the central frames and the side frames; and
executing the fine-tuning with applying regularization on the connections from the side frames so as to emphasize connections between acoustic features in the central frames and units of the bottom layer of hidden layers of the Deep Neural Network.

5. A computer program product for training a Deep Neural Network for acoustic modeling in speech recognition, the computer program product comprising a computer readable storage medium having program instructions embodied therewith, the program instructions executable by a computer to cause the computer to:
read only central frames as input frames from a memory in a first reading function,
execute pre-training and fine tuning for the central frames to estimate parameters for connections between the central frames and units in a bottom layer of hidden layers;
read central frames and side frames as input frames from the memory in a next reading function; and
execute pre-training and fine-tuning for both the central frames and the side frames to emphasize connections between acoustic features in the central frames and units of the bottom layer of the hidden layers of the Deep Neural Network.

6. The computer program product of claim 5, wherein execute pre-training and fine-tuning comprises:
executing the pre-training only for the central frames;
executing the fine-tuning only for the central frames for at least one time; and
executing the fine-tuning for both the central frames and the side frames.

7. The computer program product of claim 6, wherein the execution of the fine-tuning is repeated, and the program instructions further to cause the computer to:
increase the number of frames of the central frames with each repetition of the execution of the fine-tuning with the central frames.

8. The computer program product of claim 5, wherein execute pre-training and fine-tuning comprises:
executing the pre-training for both the central frames and the side frames; and
executing the fine-tuning with applying regularization on the connections from the side frames so as to emphasize connections between acoustic features in the central frames and units of the bottom layer of hidden layers of the Deep Neural Network.

9. An information processing apparatus comprises:
a memory storing central frames and side frames; and
a processor comprising a pre-trainer module and a fine-tuner module, the pre trainer module and the fine-tuner module configured to:
read only the central frames as input frames from the memory in a first reading function;
execute pre-training and fine tuning for the central frames to estimate parameters for connections between the central frames and units in a bottom layer of hidden layers;
read central frames and side frames as input frames from the memory in a second reading function; and
execute pre-training and fine-tuning for both the central frames and the side frames to emphasize connections between acoustic features in the central frames and units of the bottom layer of the hidden layers of a Deep Neural Network.

10. The information processing apparatus of claim 9, wherein execute pre-training and fine-tuning comprises:
executing the pre-training only for the central frames;
executing the fine-tuning only for the central frames for at least one time; and
executing the fine-tuning for both the central frames and the side frames.

11. The information processing apparatus of claim 10, wherein the execution of the fine-tuning is repeated, and the number of frames of the central frames is increased with each repetition of the execution of the fine-tuning with the central frames.

12. The information processing apparatus of claim 9, wherein execute pre-training and fine-tuning comprises:
executing the pre-training for both the central frames and the side frames; and
executing the fine-tuning with applying regularization on the connections from the side frames so as to emphasize connections between acoustic features in the central frames and units of the bottom layer of hidden layers of the Deep Neural Network.

13. The method of claim 1, wherein the side frames are preceding side frames preceding the central frames and/or succeeding side frames succeeding the central frames.

14. The computer program product of claim 5, wherein the side frames are preceding side frames preceding the central frames and/or succeeding side frames succeeding the central frames.

15. The information processing apparatus of claim 9, wherein the side frames are preceding side frames preceding the central frames and/or succeeding side frames succeeding the central frames.

* * * * *